United States Patent
Watanabe et al.

(10) Patent No.: US 10,635,158 B1
(45) Date of Patent: Apr. 28, 2020

(54) WRITE DATA PROTECTION AT EMERGENCY POWER OFF

(71) Applicant: Western Digital Technologies, Inc., San Jose, CA (US)

(72) Inventors: Hiroki Watanabe, Fujisawa (JP); Gaku Ikedo, Chigasaki (JP); Naoyuki Kagami, Fujisawa (JP); James Jinshi Ng, Fremont, CA (US); Brian Kenneth Tanner, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 370 days.

(21) Appl. No.: 15/494,716

(22) Filed: Apr. 24, 2017

Related U.S. Application Data

(60) Provisional application No. 62/438,850, filed on Dec. 23, 2016.

(51) Int. Cl.
*G06F 1/3296* (2019.01)
*G11B 19/20* (2006.01)
(Continued)

(52) U.S. Cl.
CPC .......... *G06F 1/3296* (2013.01); *G06F 1/3287* (2013.01); *G06F 3/065* (2013.01);
(Continued)

(58) Field of Classification Search
CPC .... G06F 11/1441; G06F 1/30; G06F 11/2015; G06F 1/263; G06F 1/28; G06F 3/061;
(Continued)

(56) References Cited

U.S. PATENT DOCUMENTS 5,905,994 A    5/1999  Hori et al.
8,479,032 B2   7/2013  Trantham et al.
(Continued)

OTHER PUBLICATIONS

Cache Data Protection During Power Failures—Cache Guard; date unknown; 1 page. http://www.fujitsu.com/global/products/computing/storage/disk/eternus-dx/feature/strsys-a03.html.

*Primary Examiner* — Terrell S Johnson
(74) *Attorney, Agent, or Firm* — Patterson + Sheridan, LLP; Steven Versteeg

(57) ABSTRACT

The present disclosure generally relates to an electronic circuit and method of operating thereof to back up write cache data on DDR memory in data storage devices during an emergency power off (EPO). The method involves using a power management integrated circuit (PMIC), a combo driver and one MOSFET for regulator output. The method involves detecting a voltage value that is below a predetermined threshold value, retracting a write head away from a hard disk drive (HDD), backing up data, and then resetting the HDD after the backup is complete. The backing up and retraction may occur in parallel or in sequence. The method utilizes the spindle back-electromotive force (BEMF) power to have sufficient power to make the backup. If the power from the spindle BEMF is too low, then the retraction is suspended and a high impedance is present to lighten the load until the BEMF recovers before the power on reset. As such, the back-up data is not reset and volatized by a lack of power.

22 Claims, 4 Drawing Sheets

(51) Int. Cl.
  *G06F 3/06* (2006.01)
  *G06F 1/3287* (2019.01)
  *H02P 6/08* (2016.01)
  *H02P 6/18* (2016.01)
  *H02P 6/182* (2016.01)

(52) U.S. Cl.
  CPC .......... *G06F 3/0619* (2013.01); *G06F 3/0689* (2013.01); *G11B 19/2054* (2013.01); *G11B 19/2081* (2013.01); *G11B 19/20* (2013.01); *H02P 6/085* (2013.01); *H02P 6/18* (2013.01); *H02P 6/182* (2013.01)

(58) Field of Classification Search
  CPC ...... G06F 3/0619; G06F 3/065; G06F 3/0659; G06F 3/0689; G11B 19/047; G11B 19/044; G11B 19/2081; G11B 5/012; G11B 5/02; G11B 19/20; G11C 5/145; G11C 5/147; H02P 6/085; H02P 6/10; H02P 6/18; H02P 6/182
  See application file for complete search history.

(56) References Cited

U.S. PATENT DOCUMENTS

| | | |
|---|---|---|
| 8,868,938 B2 | 10/2014 | Luo et al. |
| 8,892,817 B2 | 11/2014 | Bandic et al. |
| 8,947,813 B2 | 2/2015 | Chatradhi et al. |
| 9,355,674 B2 | 5/2016 | Kim et al. |
| 2014/0160595 A1* | 6/2014 | Chatradhi .......... G11B 19/2081 360/99.08 |
| 2015/0091475 A1* | 4/2015 | Lieu .................. H02J 9/06 318/3 |
| 2015/0100820 A1 | 4/2015 | Faulhaber et al. |
| 2016/0085451 A1 | 3/2016 | Lee-Baron et al. |
| 2016/0180877 A1* | 6/2016 | Nicholls ............... G11B 21/12 360/71 |

\* cited by examiner though other and further embodiments of the disclosure may achieve, is not to be considered limiting of the scope of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

WRITE DATA PROTECTION AT EMERGENCY POWER OFF

CROSS-REFERENCE TO RELATED APPLICATIONS

This application claims benefit of U.S. Provisional Patent Application Ser. No. 62/438,850, filed Dec. 23, 2016, which is herein incorporated by reference.

BACKGROUND OF THE DISCLOSURE

Field of the Disclosure

Embodiments of the present disclosure generally relate to an electronic circuit and method of operating thereof to back up write cache data on double data rate (DDR) memory in data storage devices during an emergency power off (EPO).

Description of the Related Art

Storage devices, such as hard disk drives (HDDs), utilize a power source to sufficiently run the various components of the device. For example, power is utilized to spin the storage media in a HDD. Additionally, power is utilized to move a read/write head into a position above the storage media to read/write data from/to the media. Also, power is utilized to operate any silicon on chip (SoC), DDR or flash memory that may be present in the storage device.

Sometimes during operation of storage devices, there is an EPO event. Typically, an EPO event is not expected and not planned, hence the emergency designation. Thus, a user may have been in the process of utilizing the storage device, but had not yet saved all data to the storage device. As any user can attest to, it is quite frustrating to lose unsaved data due to an EPO. That is why, oftentimes, computer software is arranged with an autosave feature so that data is automatically saved periodically at a time period that the user may specify.

During an EPO event, the amount of energy that is available to power an emergency save of data is very small and thus, the amount of data that can be saved is very small. Much data is lost due to the lower amount of energy available to save the data.

Therefore, there is a need in the art to back-up data during an EPO so that data that would otherwise be lost may be saved.

SUMMARY OF THE DISCLOSURE

The present disclosure generally relates to an electronic circuit and method of operating thereof to back up write cache data on DDR memory in data storage devices during an EPO. The method involves using a power management integrated circuit (PMIC), a combo driver and one MOSFET for regulator output. The method involves detecting a voltage value that is below a predetermined threshold value, retracting a write head away from an HDD, backing up data and then resetting the HDD after the backup is complete. The back-up and retraction may occur in parallel or sequentially. The method utilizes the spindle back-electromotive force (BEMF) to have sufficient power to make the back-up. If the power from the spindle BEMF is too low, then the retraction is suspended and a high impedance is present to lighten the load until the BEMF recovers before the power on reset. As such, the back-up data is not reset and volatized by a lack of power.

In one embodiment, a method of write data protection during an EPO comprises detecting a low voltage on a power line; determining if the low voltage is below a threshold value; maintaining a predetermined voltage level using power from a spindle BEMF power; retracting a write head; backing-up data; and executing power on reset.

In another embodiment, an electronic circuit comprises a power management integrated circuit (PMIC); a NMOS transistor; and a combo driver coupled to both the PMIC and the NMOS transistor. The combo driver includes: an emergency power off regulator controller; a regulator; and a comparator coupled to the emergency power off regulator controller.

In another embodiment, an electronic circuit comprises a power management integrated circuit (PMIC); a NMOS transistor; and means for maintaining a predetermined voltage level using power from a spindle back-electromotive force power.

In another embodiment, a data storage device comprises one or more magnetic storage medias; a motor coupled to the one or more magnetic storage medias; and means for maintaining a predetermined voltage level using power from the motor.

In another embodiment, a data storage device comprises one or more magnetic storage medias; a motor coupled to the one or more magnetic storage medias; and an electronic circuit coupled to the motor, the electronic circuit including an emergency power off regulator controller that is coupled to a comparator.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to an electronic circuit and method of operating thereof to back up write cache data on DDR memory in data storage devices during an EPO. The method involves using a PMIC, a combo driver and one MOSFET for regulator output. The method involves detecting a voltage value that is below a predetermined threshold value, retracting a write head away from an HDD, backing up data, and then resetting the HDD after the backup is complete. The back-up and retraction may occur in parallel or sequentially. The method utilizes the spindle BEMF power to have sufficient power to make the backup. If the power from the spindle BEMF is too low, then the retraction is suspended and a high impedance is present to lighten the load until the BEMF recovers before the power on reset. As such, the back-up data is not reset and volatized by a lack of power.

Figure 1:
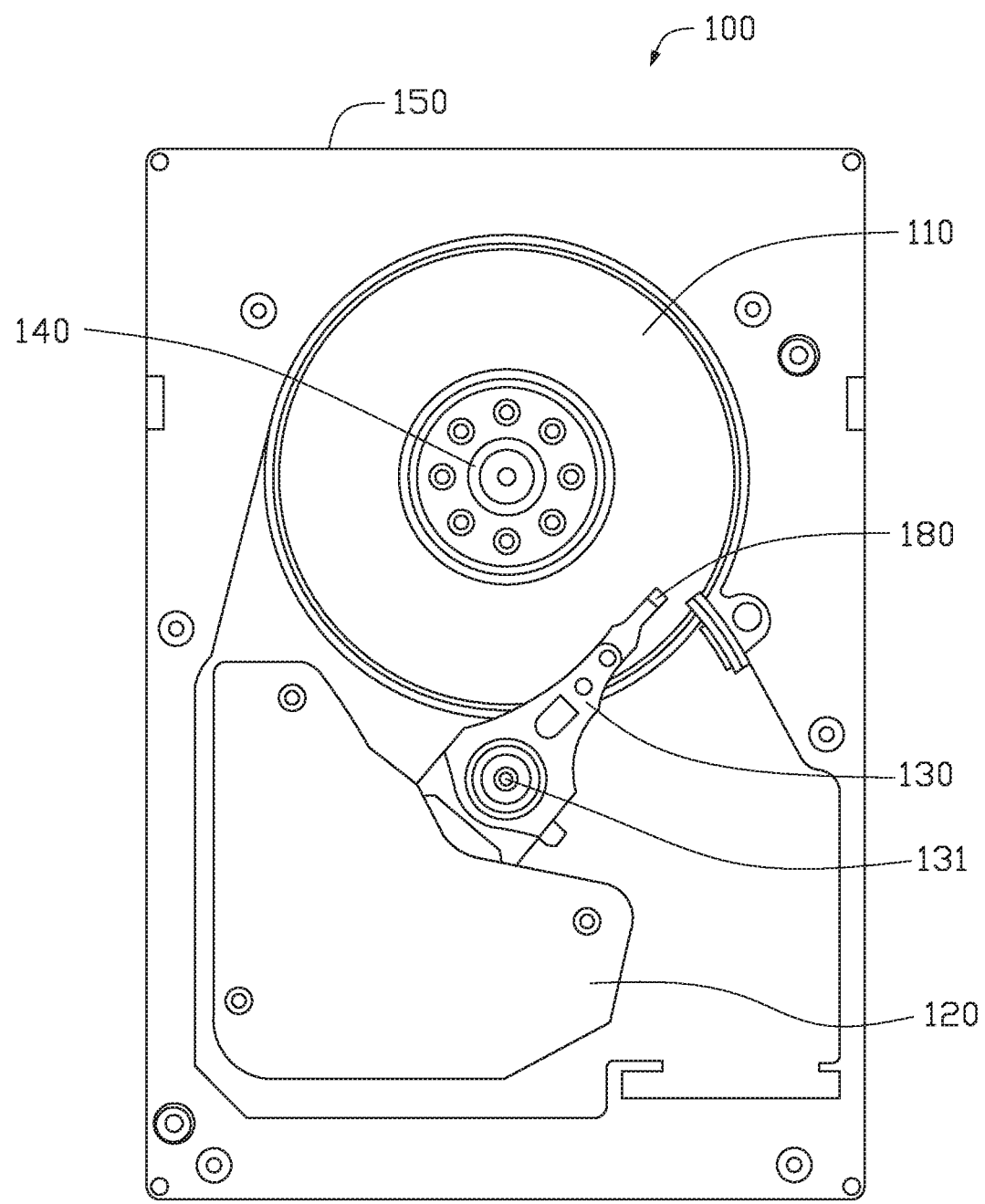
FIG. 1 is a schematic top illustration of a HDD.

FIG. 1 illustrates a top view of an exemplary data storage device 100 such as an HDD, according to an embodiment of the invention. As illustrated in FIG. 1, the data storage device 100 includes one or more magnetic media or disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
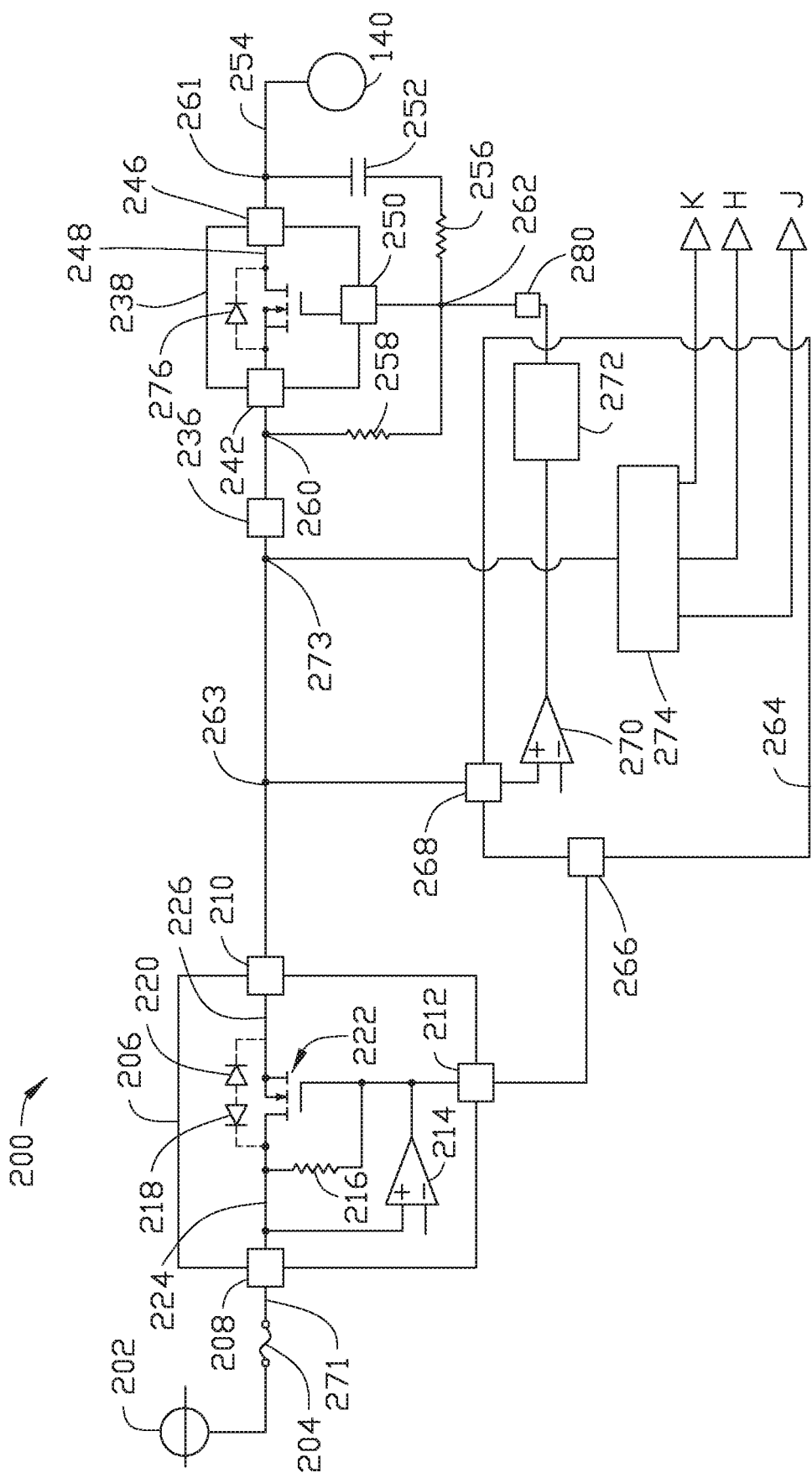
FIG. 2 is a schematic illustration of a circuit for use in a storage device.

FIG. 2 is a schematic illustration of an electronic circuit 200 for use in a data storage device. The circuit 200 includes a power source 202 having a mechanical fuse 204 coupled thereto. A PMIC 206 is coupled to the mechanical fuse 204. It is to be understood that for simplification purposes, a single line is shown leaving the power source 202, however, multiple power lines may be present not only leaving the power source 202, but also throughout the system.

The PMIC 206 includes first, second and third relays 208, 210, 212. The first relay 208 is coupled to the mechanical fuse 204 by line 271. The PMIC 206 also includes a first comparator 214, a first resistor 216, first and second diodes 218, 220 and a MOS transistor 222, such as an NMOS transistor 222. The positive voltage input to the first comparator 214 is coupled between the first relay 208 and the NMOS transistor 222 on line 224. Line 224 is couples to the drain electrode of the NMOS transistor 222. The first resistor 216 is coupled to the gate electrode of the NMOS transistor 222 and the line 224 between the first relay 208 and the NMOS transistor 222. The first diode 218 is coupled to both the line 224 and the second diode 220. The second diode 220 is coupled to both the first diode 218 and the line 226 that is coupled between the second relay 210 and the source electrode of the NMOS transistor 222. The output of the first comparator 214 is coupled to the third relay 212.

A NMOS transistor 238 is coupled between connection points 260, 261. Specifically, the NMOS transistor 238 includes a fourth relay 242 that is coupled between the connection point 260 and the drain electrode of the NMOS transistor 238. A fifth relay 246 is coupled between the source electrode of the NMOS transistor 238, along line 248, and connection point 261. A sixth relay 250 is coupled to both the fourth relay 242 and the fifth relay 246 as well as the gate electrode of the NMOS transistor 238. A capacitor 252 is coupled to the line 254 between the fifth relay 246 and the motor 140. A second resistor 256 is connected in series with the capacitor 252. A third resistor 258 is coupled to connection point 260. The third resistor 258 is also coupled to another connection point 262 disposed between both the second resistor 256, the sixth relay 250 and a seventh relay 280. The NMOS transistor 238 also includes a third diode 276 coupled between the source electrode on line 248 and a drain electrode.

A combo driver 264 is also present. The combo driver 264 includes an eighth relay 266 that is coupled to the third relay 212. A ninth relay 268 is also present. The ninth relay 268 is coupled to a connection point 263 disposed between the PMIC 206 and the NMOS transistor 238. The positive terminal of a second comparator 270 is coupled to the ninth relay 268, and the output of the second comparator 270 is coupled to an EPO regulator controller 272. The EPO regulator controller 272 is coupled to the seventh relay which is coupled to connection point 262. A regulator 274 is also present in the combo driver 264. The regulator 274 is coupled to a connection point 273 disposed between the seventh relay 234 and the eighth relay 236.

There are three main parts to the circuit 200, the PMIC 206, the NMOS transistor 238 and the combo driver 264. The PMIC 206 is the electrical fuse of both a 5V and a 12 V power line and consists of relays on both the 5V and 12V lines. The PMIC 206 protects the circuit 200 from electrical stress, which is a reverse current, over current, over voltage or low voltage such as an internal out of control voltage. The NMOS transistor 238 is a part of the EPO low drop out (LDO) regulator which sources power to regulators from 12V at EPO. The NMOS 238 is controlled at the gate electrode by the combo driver 264. The combo driver 264 has four tasks: detecting low voltage threshold (i.e., under voltage), controlling the NMOS 238 and supply to the regulator 274, regulating 1.8V, 1.5V and 0.94V from the regulator 274 as shown by arrows "J", "H" and "K", and monitoring the output of the motor 140 and suspending retraction of the arm 130 temporarily if the voltage of 254 is at a low voltage. Overall, the 5V power line is input into the PMIC 206. One of the outputs of the PMIC 206, a 5V output, is connected to the combo driver 264 power supply through the second comparator 270 and relay 268. The 5V output is also connected to the regulator 274 power supply through connection point 273. The 5V output is also connected to the output of the EPO LDO through the capacitor 252 and resistors 256, 258. Between the NMOS 238 and the motor 140 is the connection point 261 that branches out to the input of the EPO LDO through capacitor 252 and resistors 256, 258.

During normal operation, the PMIC 206 is on, 5V is supplied. The motor 140 is spinning by 12V power on line 254 under the combo driver 264, and NMOS 238 is off by isolation from point 260. The regulator 274 provides power to the SoC, DDR and flash memory. When an EPO event happens, the PMIC 206 is turned off and the HDD is isolated from external power. Therefore, all of the power is provided by BEMF of the motor 140. The 12V power line obtains power from the rectified motor 140 BEMF, and the 5V power is provided with regulated 12V power. The regulator 274 in the combo driver 264 makes the voltage for the 5V line.

Figure 3:
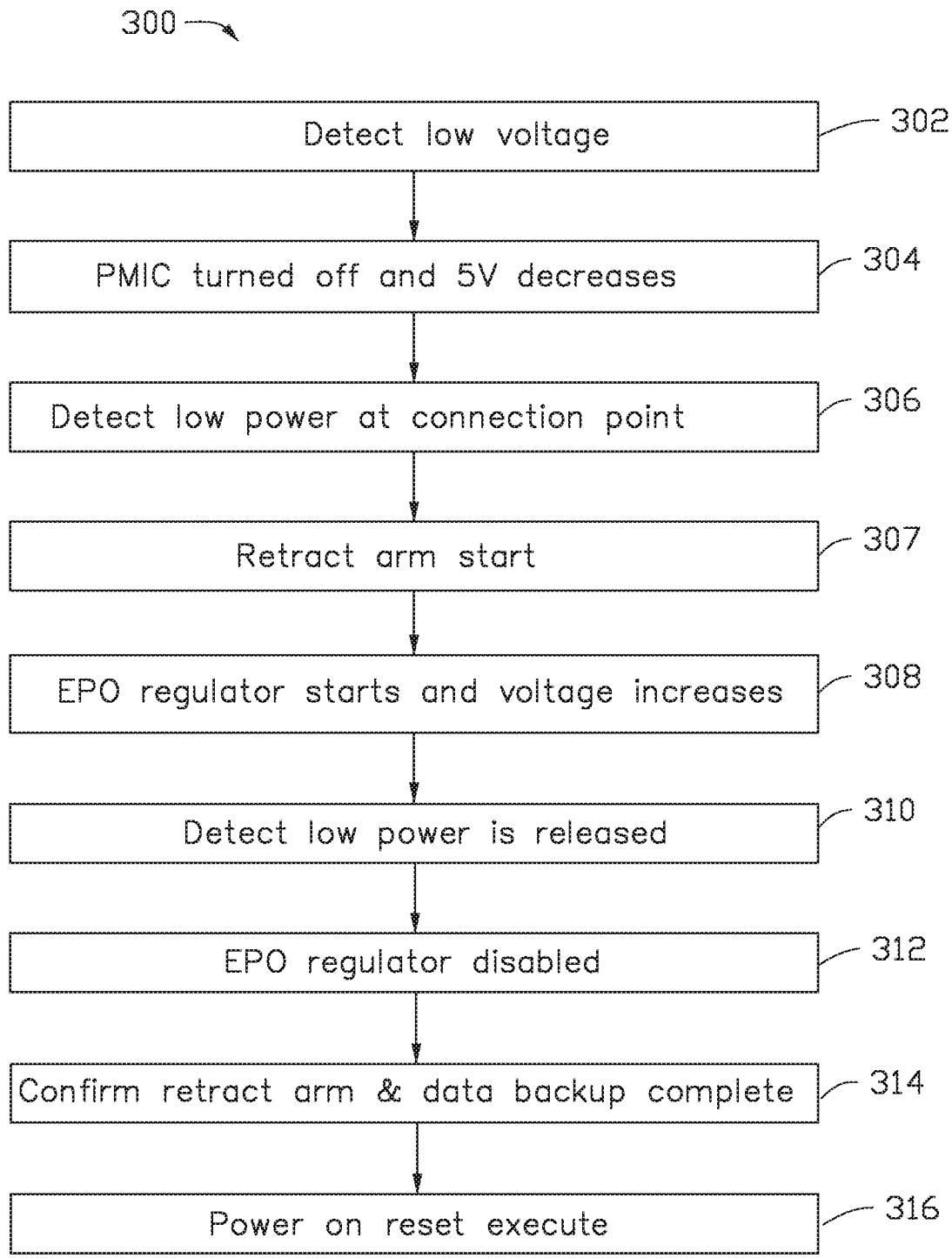
FIG. 3 is a flow chart illustrating a method of backing up write data during an EPO according to one embodiment.

FIG. 3 is a flow chart 300 illustrating a method of backing up write data during an EPO according to one embodiment. The method starts by detecting a low voltage (block 302). The e-fuse in the PMIC is off at this point and the 5V decreases in block 304. The combo driver detects the lower power at connection point 263 (block 306). The EPO regulator then starts and the voltage increases (block 308). The combo driver then detects that the low power is released in block 310. The EPO regulator is then disabled and the voltage again decreases (block 312). Thereafter, blocks 306, 308, 310 and 312 are repeated until the voltage has recovered. Simultaneously, the arm is retracted in block 314 or, alternately, the data is backed up to flash memory by using 1.8V/1.5V/0.9V power regulator. After the complete data backup, power on reset (POR) is executed in block 316. If the power is recovered in time, only a software reset is executed and the HDD is rebooted. If the 12V line is the low voltage line, then the retraction is suspended temporarily to recover the motor BEMF voltage.

During the method, the EPO regulator controller 272 "pulses" the NMOS 238 while the PMIC 206 is off. In the 5V example, the voltage on the line through the circuit 200 continues to drop. When the voltage drops below a predetermined threshold (e.g., 4.1V), the NMOS is controlled so that the voltage increases to a voltage release value above the threshold (e.g., 4.35V). As the voltage drops, the cycle repeats and the NMOS 238 is thus "pulsed" by the EPO regulator controller 272. Once the voltage is back to above a voltage release value, the PMIC 206 is turned back on and the NMOS is no longer controlled by the EPO regulator controller 272.

Figure 4:
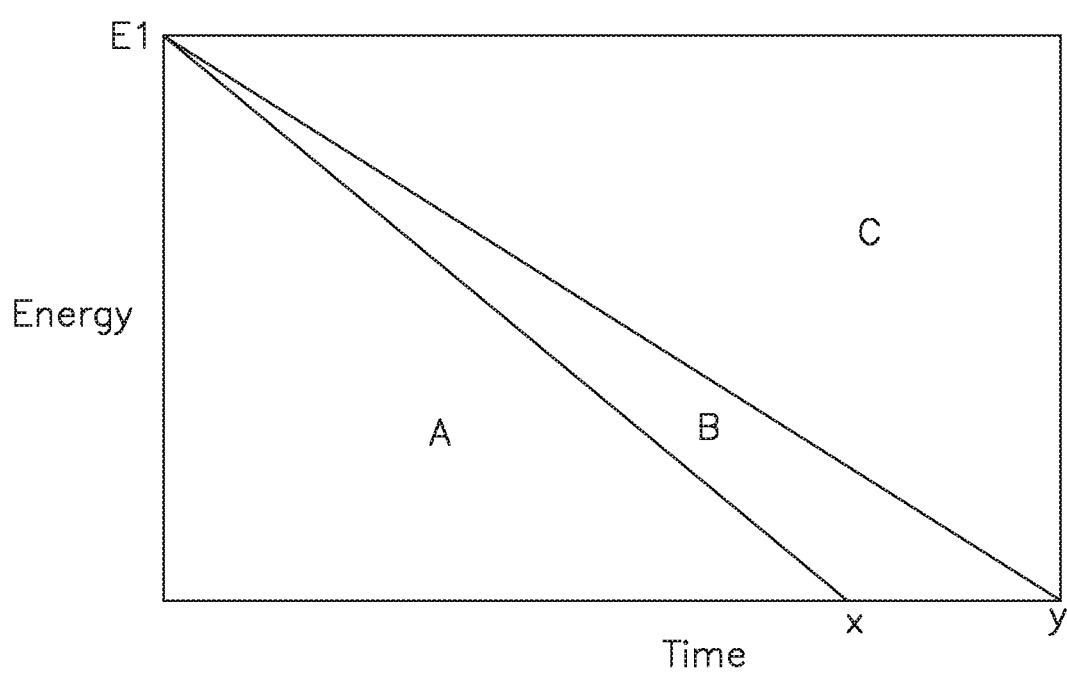
FIG. 4 graphically illustrates the amount of extra time available for backing up data during an EPO event.

FIG. 4 graphically illustrates the amount of extra time available for backing up data during an EPO event. E1 is the initial energy when the power is off. Area "A" illustrates the remaining rotational energy in the HDD motor during an EPO event. The maximum back-up time available is shown by data point X. Area "C" shows the energy available for back-up data during an EPO using the method discussed herein. Area "B" shows the consumption of energy on the EPO NMOS during the EPO event; if "B" is saved power, then the backup time available can be increased (i.e., X to Y). Data point Y is the maximum back-up time available using the NMOS during an EPO event. Data point Y is greater than data point X and thus, using the NMOS transistor, the amount of time available to back-up data during an EPO is increased. Area "B" is saved power by switching operation on NMOS 238.

It is to be understood that while a 5V line and a 12V line have been discussed herein, other voltages are contemplated. For example, the two power lines may simply have different voltages where one line is a low voltage relative to the other line. In the embodiments discussed herein, the NMOS transistor repeatedly turns on and off with low resistances so that consumption of the NMOS power is greatly reduced so that the back-up time can be lengthened. In one embodiment, the PMIC may be replaced with an e-fuse.

The benefit of the embodiments disclosed herein is that data that would be otherwise lost may be saved even during an EPO event.

While the foregoing is directed to embodiments of the present disclosure, other and further embodiments of the disclosure may be devised without departing from the basic scope thereof, and the scope thereof is determined by the claims that follow.

What is claimed is:

1. A method of write data protection during an emergency power off (EPO), comprising:
   detecting a low voltage on a power line of an electronic circuit, the electronic circuit comprising a power management integrated circuit (PMIC) and a NMOS transistor;
   determining if the low voltage is below a threshold value;
   maintaining a predetermined voltage level using power from a spindle back-electromotive force (BEMF) power when the low voltage is detected to be below the threshold, wherein the electronic circuit further comprises means for maintaining the predetermined voltage level using power from the spindle BEMF power;
   retracting a write head;
   backing-up data; and
   executing power on reset.

2. The method of claim 1, further comprising turning off a-PMIC switch after determining that the low voltage is below a threshold voltage.

3. The method of claim 2, wherein the detected low voltage goes down after the PMIC switch is turned off.

4. The method of claim 3, wherein the detected voltage is kept at 4.2 volts with power from a different voltage line.

5. The method of claim 4, wherein the voltage from the different voltage line is from the spindle BEMF power.

6. The method of claim 5, wherein a combo driver detects the low voltage and then controls the NMOS transistor for low drop out (LDO).

7. The method of claim 6, wherein the retraction starts at the same time as the control of the NMOS transistor for LDO.

8. The method of claim 1, wherein the backup occurs after the retraction completes.

9. The method of claim 1, wherein the backup occurs while the retraction is occurring.

10. The method of claim 1, wherein during detecting a low voltage on a power line, no external power is present.

11. An electronic circuit, comprising:
    a power management integrated circuit (PMIC);
    a NMOS transistor; and
    means for maintaining a predetermined voltage level using power from a spindle back-electromotive force power.

12. The electronic circuit of claim 11, further comprising means for detecting a low voltage threshold has been reached.

13. The electronic circuit of claim 11, further comprising means for controlling the NMOS transistor.

14. The electronic circuit of claim 11, further comprising means to regulate voltage.

15. The electronic circuit of claim 11, further comprising means for monitoring output of a motor.

16. A data storage device, comprising:
    one or more magnetic storage medias;
    a motor coupled to the one or more magnetic storage medias; and
    means for maintaining a predetermined voltage level using power from the motor.

17. The data storage device of claim 16, further comprising:
    an arm disposed over the one or more magnetic storage medias; and means to retract the arm upon detecting a voltage level decrease.

18. The data storage device of claim 16, further comprising means to isolate the motor from power.

19. The data storage device of claim 16, further comprising:
   a NMOS transistor coupled to the motor; and
   means to pulse the NMOS transistor.

20. A method of write data protection during an emergency power off (EPO), comprising:
   detecting a low voltage on a power line;
   determining if the low voltage is below a threshold value;
   maintaining a predetermined voltage level using power from a spindle back-electromotive force (BEMF) power when the low voltage is detected to be below the threshold;
   turning off a power management integrated circuit (PMIC) switch after determining that the low voltage is below a threshold voltage, wherein the detected low voltage goes down after the PMIC switch is turned off;
   retracting a write head;
   backing-up data; and
   executing power on reset.

21. The method of claim 20, wherein the detected voltage is kept at 4.2 volts with power from a different voltage line, and wherein the voltage from the different voltage line is from the spindle BEMF power.

22. The method of claim 21, wherein a combo driver detects the low voltage and then controls the NMOS transistor for low drop out (LDO), and wherein the retraction starts at the same time as the control of the NMOS transistor for LDO.

* * * * *